United States Patent Office.

FRIEDRICH WILHELM WENDENBURG, OF STOLPE, PRUSSIA, GERMANY.

PREPARING FOOD FOR ANIMALS.

SPECIFICATION forming part of Letters Patent No. 389,270, dated September 11, 1888.

Application filed January 7, 1886 Serial No. 187,884. (No specimens.) Patented in Germany November 15, 1884, No. 32,329; in France February 13, 1885, No. 167,016; in Belgium December 29, 1885, No. 71,403; in Sweden December 30, 1885, No. 409; in Russia January 7, 1886; in Austria-Hungary January 22, 1886, No. 4,340 and No. 35,594.

*To all whom it may concern:*

Be it known that I, FRIEDRICH WILHELM WENDENBURG, of the town of Stolpe, in the Kingdom of Prussia and German Empire, have invented a certain new and useful Process for Manufacturing Food for Animals from Wood-Powder, (for which I have obtained Letters Patent as follows: in Germany, dated November 15, 1884, No. 32,329; in France, dated February 13, 1885, No. 167,016; in Belgium, dated December 29, 1885, No. 71,403; in Sweden, dated December 30, 1885, No. 409; in Russia, filed January 7, 1886, and in Austria-Hungary, filed January 22, 1886, granted August 6, 1886, No. 4,340 and No. 35,594,) of which I declare the following to be a specification.

My invention relates to a process for manufacturing food for animals from wood-powder, by means of which a very cheap alimentary product is attained.

It has long been known to agriculturists that cattle and other animals readily eat the bark and also the wood of various trees; but previous to my invention no one has thought of employing wood as food for animals. Now, I prepare wood in a simple, economical manner and produce a nutritious food for animals therefrom, as will be found by the following analysis.

The wood is first reduced to a fine powder, mixed with acidulated water or the waste lye of distilleries, and can, after being diluted and well stirred and allowed to stand for about two hours, be employed immediately as food for cattle, or can be dried and formed into cakes.

In order to carry my said invention into effect, I proceed as follows: Wood is reduced to fine powder by means of a suitable pulverizing-machine or in other suitable manner and then mixed with about three pounds of common salt for each one hundred pounds of powdered wood, to which so much scalding-hot or heated distillery waste or lye, or its equivalent containing about one-eighth pound muriatic acid, is added, so that a very thin pulp is produced, which is thoroughly stirred and then allowed to stand for about two hours. The pulpy mass can be diluted and employed direct as food for animals. In order to render this said food suitable for transport, the fluid portion is allowed to drain off and the residue then dried by driving off the moisture in suitable manner. The dried or partly-dried product can be pressed into appropriate forms or molds, or baked when of doughy consistence.

Instead of employing the lye or waste from distilleries, water acidulated by adding a suitable quantity of muriatic acid can be used.

Any kind of wood can be employed for carrying my invention into effect, although I prefer to employ beech, birch, lime, acacia, or other similar kinds of wood.

The nutritive value of my improved food for animals consists of the nutritive matter contained in the wood. For instance, one hundred parts dried material contains raw proteine, 4.9; raw fat, 1.4; soluble matter free from nitrogen, 36.0; wood fiber, 50.0; ash, 7.7.

It will be evident from the foregoing that a very cheap alimentary substance is produced and at the same time food for cattle which can be attained at all times of the year and in every country, it being so cheap that it is within the reach of the smallest cattle-owner.

Having now particularly described and ascertained the nature of my said invention and the manner of carrying the same into effect, I declare that what I claim is—

A process for manufacturing food for animals by pulverizing wood, mixing the same with common salt, scalding the same with hot acidulated waste or lye from distilleries or acidulated water, stirring the mass and allowing the same to stand for two hours, after which the said mass can be applied direct as food for cattle or other animals or be pressed or formed into cakes and then pressed for subsequent use, substantially as and for the purpose described in the foregoing specification.

In witness whereof I have hereunto signed my name in the presence of two subscribing witnesses.

FRIEDRICH WILHELM WENDENBURG.

Witnesses:
ANTHONY STEFFEN,
B. ROI.